(12) United States Patent
Tanimura

(10) Patent No.: US 7,892,470 B2
(45) Date of Patent: Feb. 22, 2011

(54) METHOD AND APPARATUS FOR PRODUCING POLYMER FILM

(75) Inventor: Kentarou Tanimura, Minami-ashigara (JP)

(73) Assignee: Fujifilm Corporation, Tokyo (JP)

( * ) Notice: Subject to any disclaimer, the term of this patent is extended or adjusted under 35 U.S.C. 154(b) by 68 days.

(21) Appl. No.: 12/088,190

(22) PCT Filed: Sep. 26, 2006

(86) PCT No.: PCT/JP2006/319651

§ 371 (c)(1),
(2), (4) Date: Mar. 26, 2008

(87) PCT Pub. No.: WO2007/037467

PCT Pub. Date: Apr. 5, 2007

(65) Prior Publication Data

US 2009/0146340 A1    Jun. 11, 2009

(30) Foreign Application Priority Data

Sep. 28, 2005    (JP) .............................. 2005-282159

(51) Int. Cl.
    *B29D 7/01* (2006.01)
(52) U.S. Cl. ................. 264/212; 264/165; 264/216; 264/204; 264/207
(58) Field of Classification Search ............. 264/216, 264/204, 207, 208, 165, 212
    See application file for complete search history.

(56) References Cited

U.S. PATENT DOCUMENTS

| | | | |
|---|---|---|---|
| 5,091,134 A * | 2/1992 | Oshima et al. | 264/176.1 |
| 6,340,551 B1 * | 1/2002 | Miyake et al. | 430/192 |
| 2004/0212112 A1 | 10/2004 | Tsujimoto | |
| 2005/0023720 A1 * | 2/2005 | Takeuchi | 264/216 |
| 2005/0073072 A1 | 4/2005 | Takeuchi | |
| 2005/0211033 A1 * | 9/2005 | Matsuura | 83/13 |

FOREIGN PATENT DOCUMENTS

| | | |
|---|---|---|
| JP | 11-090942 | 4/1999 |
| JP | 2003-033933 A | 2/2003 |
| JP | 2004-074568 A | 3/2004 |
| JP | 2005-111969 A | 4/2005 |

OTHER PUBLICATIONS

The Second Office Action, dated Sep. 15, 2010, issued in corresponding CN Application No. 200680035623.6, 7 pages in English.

* cited by examiner

*Primary Examiner*—Christina Johnson
*Assistant Examiner*—Elizabeth Royston
(74) *Attorney, Agent, or Firm*—Sughrue Mion, PLLC

(57) ABSTRACT

A casting film is formed by casting a dope containing a polymer and a solvent onto a support. Thereafter, the casting film is peeled off from the support as a wet film (74). The wet film (74) is transported to a tenter device (47) having plural tenter clips (101). Before holding side edges of the wet film (74) by the tenter clips (101), air is blown from an outlet (120*a*) of an air nozzle (120) to a curled portion (74*a*) such that the air is pressed against the curled portion (74*a*). Thereby, the curled portion (74*a*) is flattened to become an approximately flat portion (74*b*).

10 Claims, 5 Drawing Sheets

METHOD AND APPARATUS FOR PRODUCING POLYMER FILM

TECHNICAL FIELD

The present invention relates to a method and an apparatus for producing a polymer film.

BACKGROUND ART

Polymer films are widely used for optical purposes. In particular, cellulose acylate films are commonly used as optical films for producing liquid crystal display devices of thin types at low cost since the cellulose acylate films can be used for protective films for polarizing filters and the like.

The above polymer films are mainly produced by solution casting methods. In the solution casting method, a polymer solution (a dope) containing a polymer such as cellulose acylate and a solvent is cast onto a moving support to form a casting film. The casting film is peeled off from the support as a wet film. The wet film is dried to form the polymer film.

The wet film is dried while being supported by plural rollers during the transportation. It is also possible to use a tenter device for drying the wet film. In the tenter device, the wet film is dried while both side edges of the wet film are held and stretched by holding members. However, in the above cases, after the casting film is peeled off as the wet film from the support, the drying levels may vary with portions of the wet film such as both side edges, a center portion, and front and back surfaces, resulting in curls in the both side edges of the wet film. The size of the curls increases as the drying proceeds.

However, such large curls may cause the holding defects such as foldings and ruptures of the wet film especially in using the tenter device where the side edges of the wet film are held by the holding members (for instance, clips). If the holding defects occur, the holding members cannot stably hold the side edges of the wet film. As a result, problems may arise such as uneven tension applied to the wet film, causing the reduction of the stability in the transportation of the wet film.

To prevent the holding defects in the tenter device, a film production apparatus which cuts off the side edges of the wet film between the peeling process of the wet film from the support and the winding process, and a film production apparatus provided with a curl preventing device are suggested. The curl preventing device has a pair of upper and lower guide plates disposed on both side edges of the tenter device close to the entrance thereof to guide the side edges of the wet film for preventing curling (for instance, see Japanese Patent Laid-Open Publication No. 11-090942). Moreover, a film production apparatus in which lubricating property and durability of the guide plates are enhanced by improving the surface material thereof is suggested (for instance, Japanese Patent Laid-Open Publication No. 2003-033933).

However, since the above film production apparatuses use the guide plates, abrasion of the guide plates is caused by the contact of the guide plates to the wet film. A part of the wet film may be shaved by the guide plates, and the shavings may be mixed into the wet film during the drying process. Accordingly, degradation of the optical property such as light scattering, and that of the planarity may occur.

An object of the present invention is to provide a method and an apparatus for producing a polymer film which prevent the holding defects by approximately flattening the curls in both side edges of the wet film without contacting the wet film so that the holding members can hold the wet film easily and stably to achieve excellent film transportation stability.

DISCLOSURE OF INVENTION

In order to achieve the above object and other objects, in a method for producing a polymer film of the present invention, a casting film is formed by casting a dope containing a polymer and a solvent on a moving support. The casting film containing the solvent is peeled from the support as a wet film. An air blowing device is disposed above the wet film. The air blowing device blows the air onto each of side edge portions of the wet film. The air presses against each of the side edge portions to approximately flatten the side edge portions. An air outlet of the air blowing device is provided above each of the side edge portions. The wet film is transported while approximately flattened side edge portions are held by film holders.

It is preferable that a distance H1 between the wet film and a lower end of the air outlet is in a range of 5 mm to 50 mm. It is preferable that an angle θ between an air blowing direction of the air from the air outlet and the wet film is in a range of 17° to 60°.

It is preferable that an air velocity V of the air blown from the air outlet is in a range of 30 m/sec to 100 m/sec. It is preferable that the air outlet is a slit extending in a transporting direction of the wet film, and a slit width W1 is in a range of 0.5 mm to 5 mm.

It is preferable that a distance L1 between an upstream end PU of the air outlet in the transporting direction and a hold start position PH of the wet film by the film holder is in a range of 10 mm to 500 mm. It is preferable that a distance L2 between the hold start position PH and a downstream end PD of the air outlet in the transporting direction is in a range of 0 mm to 200 mm. It is preferable that the polymer is cellulose acylate.

It is preferable that a remaining solvent in the wet film immediately after peeled off from the support is in a range of 10 mass % to 200 mass %. It is preferable that a thickness of a polymer film obtained by drying the wet film is in a range of 30 μm to 300 μm.

An apparatus for producing a polymer film of the present invention includes a casting film forming device, a peeling device, an air blowing device, and a holding and drying device. The casting film forming device forms a casting film by casting a dope containing a polymer and a solvent onto a moving support. The peeling device peels the casting film containing the solvent from the support as a wet film. The air blowing device is provided above the wet film. The air blowing device blows air onto a side edge portion of the wet film. An air outlet of the air blowing device is positioned above the side edge portion. The holding and drying device holds the side edge portion onto which the air is blown, and dries the film while the film is transported.

According to the present invention, holding defects are prevented by approximately flattening the curls in the side edge portions without contacting the wet film. Thereby, the film holders can hold the approximately flattened side edge portions of the wet film. Accordingly, the polymer film is produced while the transportation stability is improved.

BEST MODE FOR CARRYING OUT THE INVENTION

Figure 1:
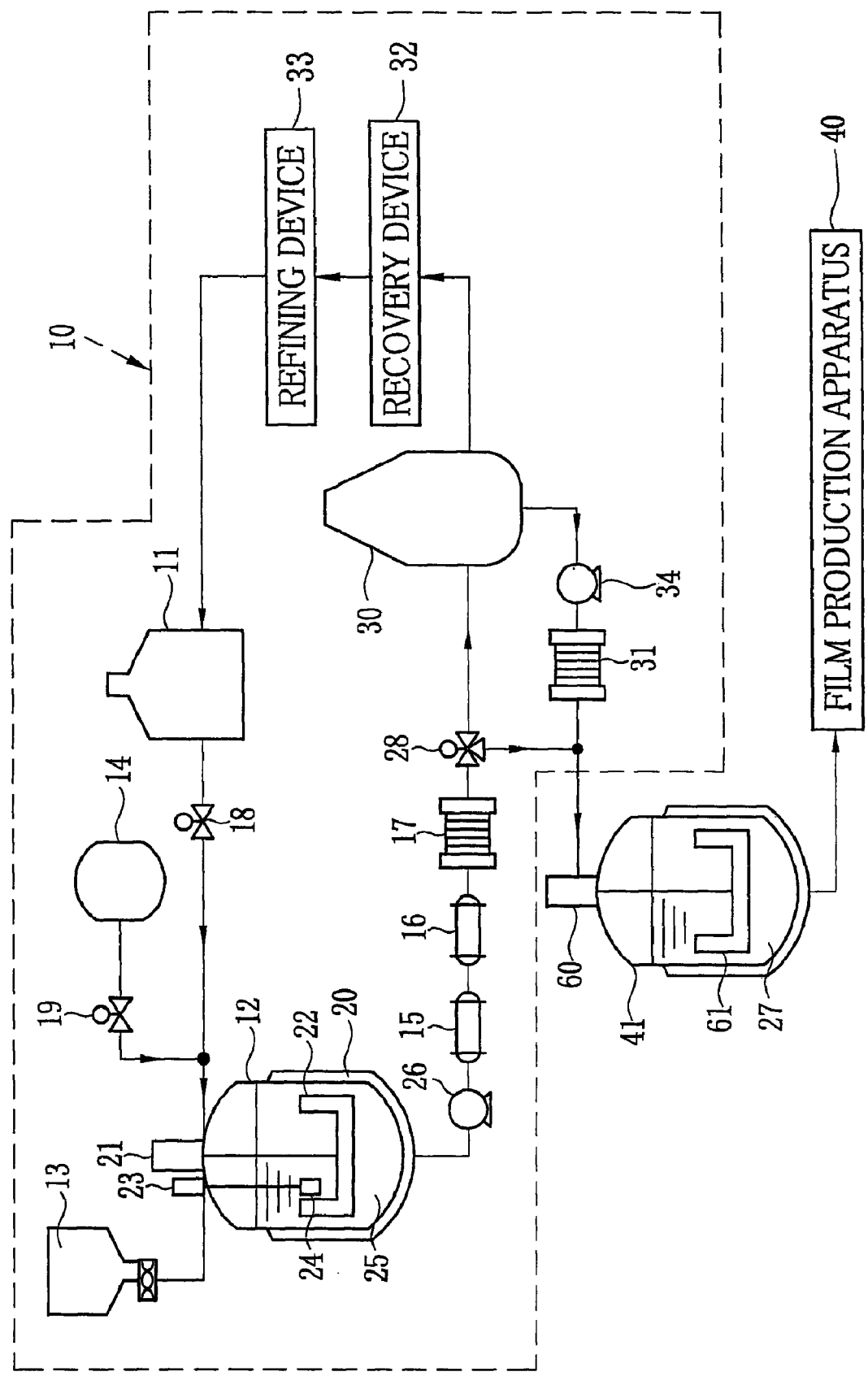
FIG. 1 is a schematic view of a dope production apparatus of the present invention.

In the following, embodiments of the present invention will be explained. However, the present invention is not limited to these embodiments.

[Raw Materials]

Cellulose acylate is preferable as a polymer to be used in this embodiment. Triacetyl cellulose (TAC) is especially preferable as the cellulose acylate. It is preferable in cellulose acylate that the degree of substitution of acyl groups for hydrogen atoms on hydroxyl groups of cellulose preferably satisfies all of following formulae (I)-(III). In these formulae (I)-(III), A is the degree of substitution of the acetyl groups for the hydrogen atoms on the hydroxyl groups of cellulose, and B is the degree of substitution of the acyl groups for the hydrogen atoms while each acyl group has carbon atoms whose number is from 3 to 22. Note that at least 90 mass. % of TAC is particles having diameters from 0.1 mm to 4 mm. Further, polymer to be used in the present invention is not restricted in cellulose acylate.

$$2.5 \leq A+B \leq 3.0 \quad \text{(I)}$$

$$0 \leq A \leq 3.0 \quad \text{(II)}$$

$$0 \leq B \leq 2.9 \quad \text{(III)}$$

A glucose unit constructing cellulose with β-1,4 bond has the free hydroxyl groups on $2^{nd}$, $3^{rd}$ and $6^{th}$ positions. Cellulose acylate is polymer in which, by esterification, the hydrogen atoms on the part or all of the hydroxyl groups are substituted by the acyl groups having at least two carbon atoms. The degree of acylation is the degree of the esterification of the hydroxyl groups on the $2^{nd}$, $3^{rd}$, $6^{th}$ positions. In each hydroxyl group, if the esterification is made at 100%, the degree of acylation is 1.

Herein, if the acyl group is substituted for the hydrogen atom on the $2^{nd}$ position in a glucose unit, the degree of the acylation is described as DS2 (the degree of substitution by acylation on the $2^{nd}$ position), and if the acyl group is substituted for the hydrogen atom on the $3^{rd}$ position in the glucose unit, the degree of the acylation is described as DS3 (the degree of substitution by acylation on the $3^{rd}$ position). Further, if the acyl group is substituted for the hydrogen atom on the $6^{th}$ position in the glucose unit, the degree of the acylation is described as DS6 (the degree of substitution by acylation on the $6^{th}$ position). The total of the degree of acylation, DS2+DS3+DS6, is preferably 2.00 to 3.00, particularly 2.22 to 2.90, and especially 2.40 to 2.88. Further, DS6/(DS2+DS3+DS6) is preferably at least 0.28, particularly at least 0.30, and especially 0.31 to 0.34.

In the present invention, the number and sort of the acyl groups in cellulose acylate may be only one or at least two. If there are at least two sorts of acyl groups, one of them is preferably the acetyl group. If the hydrogen atoms on the $2^{nd}$, $3^{rd}$ and $6^{th}$ hydroxyl groups are substituted by the acetyl groups, the total degree of substitution is described as DSA, and if the hydrogen atoms on the $2^{nd}$, $3^{rd}$ and $6^{th}$ hydroxyl groups are substituted by the acyl groups other than acetyl groups, the total degree of substitution is described as DSB. In this case, the value of DSA+DSB is preferably 2.22 to 2.90, especially 2.40 to 2.88.

Further, DSB is preferably at least 0.30, and especially at least 0.7. According to DSB, the percentage of the substitution on the $6^{th}$ position to that on the $2^{nd}$, $3^{rd}$ and $6^{th}$ positions is at least 20%. However, the percentage is preferably at least 25%, particularly at least 30%, and especially at least 33%. Further, DSA+DSB of the $6^{th}$ position of the cellulose acylate is preferably at least 0.75, particularly at least 0.80, and especially at least 0.85. In the case these sorts of cellulose acylate are used, a solution (or dope) having preferable solubility especially to the non-chlorine type organic solvent can be produced. The above solution (or dope) also has low viscosity and good filterability.

Cellulose as raw material of acylate cellulose can be obtained from one of linter cotton and pulp. However, the cellulose is preferably obtained from linter cotton.

In cellulose acylate, the acyl group having at least 2 carbon atoms may be aliphatic group or aryl group. Such cellulose acylate is, for example, alkylcarbonyl ester and alkenylcarbonyl ester of cellulose. Further, there are aromatic carbonyl ester, aromatic alkyl carbonyl ester, or the like, and these compounds may have substituents. As preferable examples of the compounds, there are propionyl group, butanoyl group, pentanoyl group, hexanoyl group, octanoyl group, decanoyl group, dodecanoyl group, tridecanoyl group, tetradecanyol group, hexadecanoyl group, octadecanoyl group, iso-butanoyl group, t-butanoyl group, cyclohexanecarbonyl group, oleoyl group, benzoyl group, naphthylcarbonyl group, cinnamoyl group and the like. Among them, the particularly preferable groups are propionyl group, butanoyl group, dodecanoyl group, octadecanoyl group, t-butanoyl group, oleoyl group, benzoyl group, naphthylcarbonyl group, cinnamoyl group and the like, and the especially preferable groups are propionyl group and butanoyl group.

Further, following solvents can be used for preparing the dope: aromatic hydrocarbons (for example, benzene, toluene and the like), hydrocarbon halides (for example, dichloromethane, chlorobenzene and the like), alcohols (for example, methanol, ethanol, n-propanol, n-butanol, diethyleneglycol and the like), ketones (for example, acetone, methylethyl ketone and the like), esters (for example, methyl acetate, ethyl acetate, propyl acetate and the like), ethers (for example, tetrahydrofuran, methylcellosolve and the like) or the like. Note that the dope is a polymer solution or dispersion in which a polymer and the like is dissolved to or dispersed in the solvent.

The solvents are preferably hydrocarbon halides having 1 to 7 carbon atoms, and especially dichloromethane. In view of physical property such as the dissolubility of cellulose acylate, the peelability of a casting film from a support, a mechanical strength of a film, optical properties and so forth, it is preferable that one or several sorts of alcohols having 1 to 5 carbon atoms are mixed with dichloromethane. The alcohol content to the entire solvent is preferably in the range of 2 mass % to 25 mass %, and particularly in the range of 5 mass % to 20 mass %. Concretely, commonly used alcohols are methanol, ethanol, n-propanol, iso-propanol, n-butanol or the like. Among them, methanol, ethanol, n-butanol, or a mixture thereof is preferable.

Recently, in order to minimize the adverse effect to the environment, the solvent composition without the use of dichloromethane is considered. In order to achieve this objective, ethers having 4 to 12 carbon atoms, ketones having 3 to 12 carbon atoms, esters having 3 to 12 carbons, and alcohols having 1 to 12 carbons are preferable, and it is also possible to use an appropriate mixture thereof. Such mixture may contain, for instance, methyl acetate, acetone, ethanol, and n-butanol. These ethers, ketones, esters and alcohols may have the ring structures. Further, it is also possible to use the compounds having at least two of functional groups in ethers, ketones, esters and alcohols (namely, —O—, —CO—, —COO— and —OH) for the solvent.

Note that the cellulose acylate is described in detail from paragraphs [0140] to [0195] in Japanese Patent Laid-Open Publication No. 2005-104148 which can be applied to the present invention. The solvents and the additives such as plasticizers, deterioration inhibitors, UV-absorptive agents (UV agents), optical anisotropy controllers, retardation controllers, dyes, matting agents, release agents, release accelerants and the like are described in detail from paragraphs [0196] to [0516] in Japanese Patent Laid-Open Publication No. 2005-104148.

[Dope Production Method]

First, a dope is produced from the above materials. In FIG. 1, the dope production apparatus 10 is provided with a solvent tank 11 for storing a solvent, a mixing tank 12 for mixing the solvent and TAC, a hopper 13 for supplying the TAC, and an additive tank 14 for storing an additive. The dope production apparatus 10 is further provided with a heater 15 for heating a swelling liquid 25 which will be described later, a temperature controller 16 for controlling the temperature of a prepared dope 27, a first filtration device 17 for removing impurities from the dope 27, a flash device 30 for concentrating the dope 27 and a second filtration device 31. Furthermore, the dope production apparatus 10 is provided with a recovery device 32 for recovering the solvent and a refining device 33 for refining the recovered solvent. The dope production apparatus 10 is connected to a film production apparatus 40 via a stock tank 41.

Steps for producing the dope 27 by using the dope production apparatus 10 are explained. First of all, a valve 18 is opened to feed a solvent from the solvent tank 11 to the mixing tank 12. Next, a proper amount of TAC is fed from the hopper 13 to the mixing tank 12. A valve 19 is opened to feed a necessary amount of additive solution from the additive tank 14 to the mixing tank 12.

It is possible to feed the additive in other forms. For instance, in the case the additive is liquid at room temperature, the additive can be fed to the mixing tank 12 in the liquid form. Further, in the case the additive is solid, it is possible to use the hopper 13 or the like to feed the additive to the mixing tank 12. To add several additives, it is possible to put the solution in which several additives are dissolved in the additive tank 14. Also, plural additive tanks each of which is filled with the solution containing a different additive can be used. Each solution can be fed to the mixing tank 12 through a pipe independent from each other.

In the above description, the solvent (including the solvent mixture), the TAC and the additive are put into the mixing tank 12 in this order; however, the order is not limited to the above. The proper amount of the solvent can be fed to the mixing tank 12 after feeding the TAC to the mixing tank 12. Further, it is not necessary to put the additive in the mixing tank 12 in advance. The additive can be mixed to the mixed compound of the TAC and the solvent in a later process. In the present invention, it is also possible to use a mixture of solvents as the solvent. Further, there may be cases where the above mixed compound is also referred to as the dope.

As shown in FIG. 1, the mixing tank 12 is provided with a jacket 20 for covering the outer surface thereof, and a first stirrer 22 rotated by a motor 21. Further, it is preferable to attach a second stirrer 24 rotated by a motor 23 to the mixing tank 12. It is preferable that the first stirrer 22 has an anchor blade, and the second stirrer 24 has an eccentric stirrer of a dissolver type. It is preferable to regulate the temperature inside the mixing tank 12 by passing the heat transfer medium inside the jacket 17. The temperature is preferably in a range of −10° C. to 55° C. The swelling liquid 25, in which the TAC is swelled in the solvent, is obtained by properly selecting and rotating the first stirrer 22 and the second stirrer 24.

The swelling liquid 25 is fed to the heater 15 by using a pump 26. It is preferable to use the tube with the jacket for the heater 15, and it is more preferable that the tube has a structure for pressurizing the swelling liquid 25. By using the above heater 15, it becomes possible to obtain the dope by dissolving the TAC or the like in the solvent under conditions that the swelling liquid 25 is heated, or pressurized and heated. Hereinafter, the above method is referred to as a heat-dissolution method. The temperature of the swelling liquid 25 is preferably from 50° C. to 120° C. It is also possible to use a cooling-dissolving method in which the swelling liquid 25 is cooled in a range of −100° C. to −30° C. It becomes possible to sufficiently dissolve the TAC in the solvent by properly selecting one of the heat-dissolving method and the cooling-dissolving method. After the temperature of the dope 27 is adjusted at an approximate room temperature by the temperature controller 16, impurities in the dope 27 are removed by filtering the dope 27 through the first filtration device 17. An average pore diameter of a filter of the filtration device 17 is preferably 100 μm or less. Further, filtration flow volume is preferably at least 50 L/hr. After the filtration, the dope 27 is put in the stock tank 41 through a valve 28.

The above method for producing the dope 27 after preparing the swelling liquid 25 may increase production cost since the production time increases as the concentration of the TAC increases. To prevent the above problem, it is preferable to prepare the dope 27 of the intended TAC concentration by concentrating the dope of a lower TAC concentration. In this method, the dope 27 filtered through the first filtration device 17 is fed to the flash unit 30 through the valve 28. In the flash unit 30, a part of the solvent in the dope 27 is vaporized. The solvent vapor is condensed to a liquid by a condenser (not shown), and recovered by a recovering device 32. The recovered solvent is refined in the refining device 33 and reused as the solvent for the dope production. This reuse is effective in terms of cost.

The concentrated dope 27 is extracted from the flash unit 30 through a pump 34. Further, it is preferable to remove foams from the dope 27. Any known method can be used for removing the foams, for instance, the ultrasonic irradiation method. Thereafter, impurities are removed from the dope 27 through the second filtration device 31. At this time, the temperature of the dope is preferably from 0° C. to 200° C. The filtered dope 27 is stored in the stock tank 41. The stock tank 41 is provided with a stirrer 61 rotated by a motor 60. The dope 27 is constantly stirred by rotating the stirrer 61.

By using the above methods, the dope 27 is produced. The TAC concentration of the dope 27 is preferably in a range of 5 mass % to 40 mass %, more preferably in a range of 15 mass % to 30 mass % and especially preferably in a range of 17 mass % to 25 mass %. The concentration of the additives (mainly the plasticizer) is preferably kept in a range of 1 mass % to 20 mass % when the total solid content in the dope 27 is considered to be 100 mass %. Materials, dissolving and adding methods of additives, filtration methods, removal of foams and the like of the dope production method in the solution casting method for obtaining the TAC film are described in detail in paragraphs [0517]-[0616] of the Japanese patent application No. 2005-104148 which can be applied to the present invention.

[Solution Casting Method]

Figure 2:
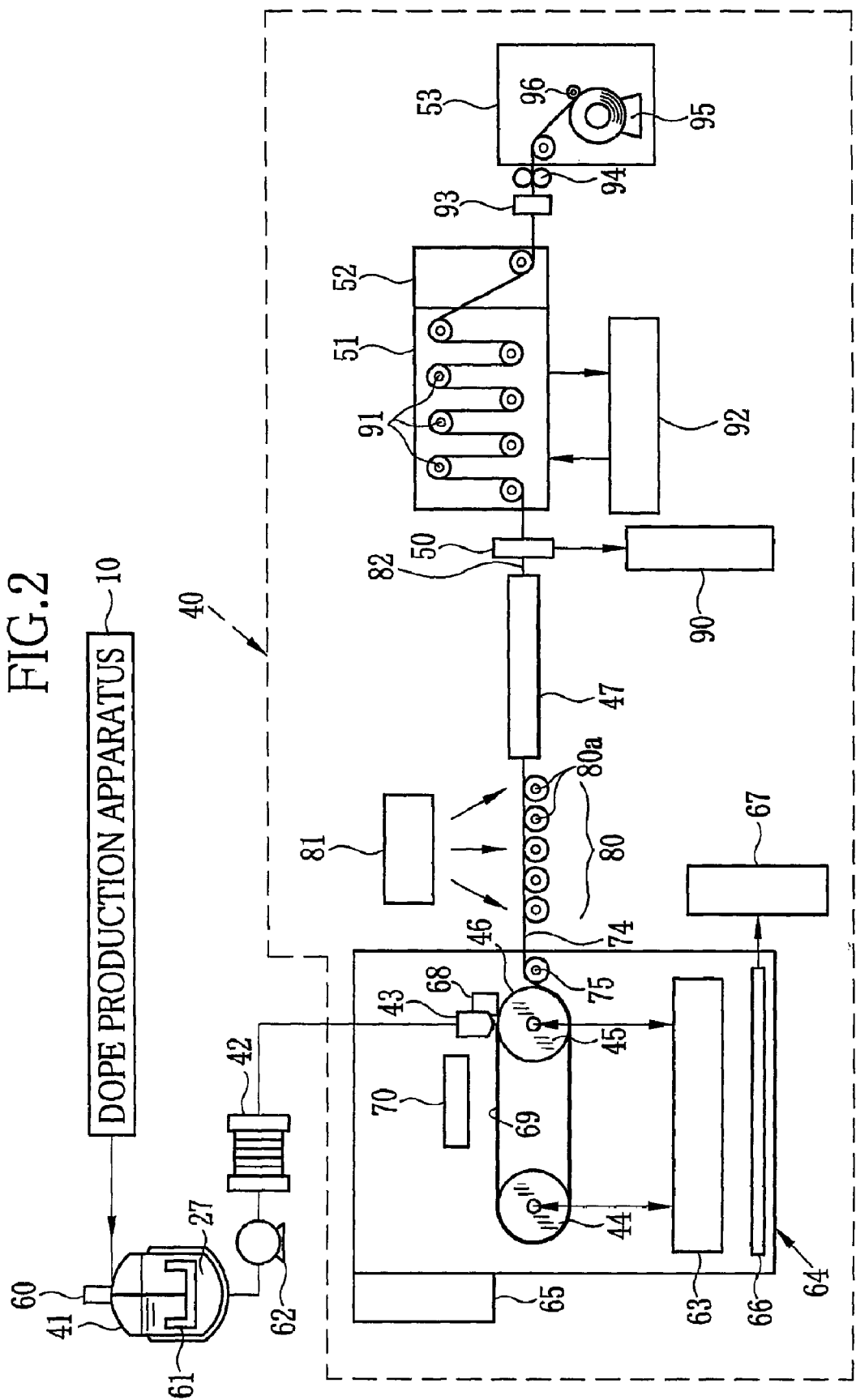
FIG. 2 is a schematic view of a film production apparatus of the present invention.

Methods for producing a film by using the dope 27 produced by the above methods are described in the following. FIG. 2 illustrates an example of a film production apparatus 40. However, the present invention is not limited to an embodiment illustrated in FIG. 2.

The film production apparatus 40 is provided with a casting die 43, and a belt 46 bridged across rollers 44 and 45, and in the downstream therefrom, a tenter device 47, an edge slitting device 50, a drying chamber 51, a cooling chamber 52 and a winding chamber 53. In the downstream from the stock tank 41 connecting the dope production apparatus 10 and the film production apparatus 40, a pump 62 and the third filtration device 42 are disposed.

A precipitation hardened stainless steel is preferable for the material of the casting die 43. The material preferably has a coefficient of thermal expansion at most $2 \times 10^{-5}$ (° C.$^{-1}$). Further, the material with the almost same anti-corrosion properties as SUS316 in examination of corrosion in electrolyte solution can also be used. Further, the material has the anti-corrosion properties which do not form pitting (holes) on the gas-liquid interface after having been dipped in a liquid mixture of dichloromethane, methanol and water for three months. Further, it is preferable to manufacture the casting die 43 by grinding the material which passed more than a month after casting. Thereby, the dope flows through the casting die 43 uniformly. Accordingly, streaks and the like in the casting film are prevented, as will be described later.

It is preferable that the finish precision of a contacting surface of the casting die 43 to the dope is 1 μm or less of the surface roughness, and the straightness is 1 μm/m or less in any direction. Clearance of the slit is automatically controlled in the range from 0.5 mm to 3.5 mm. An end of the contacting portion of each lip of the casting die 43 to the dope is processed so as to have a chamfered radius at 50 μm or less throughout the slit. Further, it is preferable to adjust the shearing speed in the casting die 43 in a range of 1 (1/sec) to 5000 (1/sec).

A width of the casting die 43 is not particularly limited. However, the width of the casting die 30 is preferably in a range of 1.1 times to 2.0 times larger than a width of the film as an end product. Further, it is preferable to install a temperature controller to the casting die 43 for maintaining a predetermined temperature during the production of the film. Further, the casting die 43 is preferably of a coathanger type. Further, it is preferable to provide bolts (heat bolts) with predetermined spacing in the width direction of the casting die 43 for adjusting the thickness of the film, and provide an automatic thickness control mechanism using the heat bolts. When using the heat bolts in the film production, it is preferable to set the profile according to the flow volume of the pump 62 based on the previously set program. It is preferable that the pump 62 is a high-precision gear pump.

It is also possible to carry out a feedback control based on an adjustment program according to a profile of a thickness gauge (not shown), for instance, an infrared thickness gauge or the like. The thickness gauge used for the above feedback control is not particularly limited. A difference in the thickness between two arbitrary points in the product film is preferably adjusted to be 1 μm or less except for the casting edge portion, and the difference between the maximum value and the minimum value of the thickness in the widthwise direction is 3 μm or less. Further, the thickness accuracy is preferably adjusted to be ±1.5 μm or less.

Further, it is more preferable that lip ends of the casting die 43 are provided with a hardened layer. In order to provide the hardened layer, there are methods of ceramic coating, hard chrome plating, nitriding treatment and the like. When the ceramics is used as the hardened layer, the ceramic which is grindable but not friable with a lower porosity and the good corrosion resistance is preferred. The ceramic which sticks to the casting die 43 but does not stick to the dope is preferable. For instance, tungsten carbide, $Al_2O_3$, TiN, $Cr_2O_3$ and the like can be used, and especially tungsten carbide (WC) is preferable. A tungsten carbide coating is performed in a spraying method.

The dope 27 discharged from the casting die 43 may be partially dried and solidified at the both edges of a slit of the casting die 43. In order to prevent such solidification of the dope, it is preferable to dispose solvent supplying devices (not shown) at both slit edges of the casting die 43. It is preferable to supply a solvent which solubilizes the dope (for instance, a solvent mixture of dichloromethane 86.5 pts. mass, methanol 13 pts. mass and n-butanol 0.5 pts. mass.) around a three-phase contact line formed by casting bead edges, casting die slit edges and air. The dope 27 is referred to as a casting bead between the casting die 43 and the belt 46. It is preferable to supply the solvent in the range from 0.1 ml/min to 1.0 ml/min to each of the slit edges so as to prevent the impurities from being mixed in the casting film. It is preferable to use a pump with a pulsation of 5% or less for supplying the dope.

Below the casting die 43, there is the belt 46 bridged across the rollers 44 and 45. The belt 46 endlessly moves in accordance with the rotation of the rollers 44 and 45 by a driving device (not shown). The moving speed of the belt 46, namely a casting speed is preferably in a range of 10 m/min to 200 m/min. Further, it is preferable that the rollers 44 and 45 are connected to a heat transfer medium circulation device 63 for keeping a surface temperature of the belt 46 at a predetermined value. The surface temperature of the belt 46 is preferably in a range of −20° C. to 40° C. In each roller 44 and 45, a heat transfer passage (not shown) is formed. The temperature of each of the rollers 44 and 45 is kept constant at predetermined values by feeding the heat transfer medium through the heat transfer passage.

A width of the belt 46 is not particularly limited. However, it is preferable that the width of the belt 46 is in a range of 1.1 times to 2.0 times larger than a casting width of the dope 27. The length of the belt 46 is preferably in a range of 20 m to 200 m. The thickness of the belt 46 is preferably in a range of 0.5 mm to 2.5 mm. It is preferable that the belt 46 is polished such that a surface roughness is at most 0.05 μm. The material of the belt 46 is preferably a stainless steel, and more preferably SUS 316 which offers sufficient corrosion resistance and strength. The thickness unevenness of the belt 46 is at most 0.5%.

It is also possible to use the rollers 44 and 45 as the supports. In this case, it is preferable to rotate the rollers 44 and 45 with high accuracy so as to keep the rotation unevenness at 0.2 mm or less, and the average surface roughness of the rollers 44 and 45 is preferably 0.01 μm or less. For this purpose, the chrome plating is applied to the surface of the rollers 44 and 45 to obtain sufficient hardness and resistance. It is necessary to minimize the surface defect of the belt 46 and the rollers 44 and 45 which may be used as the support. Concretely, the number of pin holes whose diameter is not less than 30 μm is preferably zero. The number of pinholes whose diameter is not less than 10 μm and less than 30 μm is preferably 1 or less per 1 m². The number of pinholes whose diameter is less than 10 μm is 2 or less per 1 m².

The casting die 43 and the belt 46 are accommodated in a casting chamber 64. The casting chamber 64 is provided with a temperature controlling device 65 for maintaining an inside temperature thereof at a predetermined value, and a condenser 66 for condensing the organic solvent vapor. It is preferable to install a decompression chamber 68 in the casting chamber 64 to control the pressure of an upstream area from a casting bead with respect to the transporting direction. The casting bead is formed between the casting die 43 and the belt 46. The decompression chamber 68 is used in this embodiment. A fan duct 70 is provided in the proximity of the surface of the belt 46. A roller 75 is disposed for supporting the casting film 69 peeled off from the belt 46, that is, a wet film 74.

A transporting section 80 is provided with plural rollers 80a and an air blower 81. In the downstream from the transporting section 80, the tenter device 47 in which the wet film 74 is dried to become a film 82, and the edge slitting device 50 are disposed. A crusher 90 is connected to the edge slitting device 50. The crusher 90 shreds the side edges of the film 82 cut off by the edge slitting device 50 into chips. The tenter device 47 will be described in detail later.

In the drying chamber 51, a plurality of rollers 91, and an adsorbing device 92 are provided. The adsorbing device 92 recovers the solvent vapor evaporated from the film 82 by adsorption. In FIG. 2, the cooling chamber 52 is disposed below the drying chamber 51. However, it is possible to provide a humidification chamber (not shown) between the drying chamber 51 and the cooling chamber 52.

As shown in FIG. 2, a compulsory neutralization device (neutralization bar) 93 for adjusting the charged voltage of the film 82 in a predetermined range (for instance, −3 kV to +3 kV) is disposed downstream from the cooling chamber 52. However, the position of the neutralization device 93 is not limited to this figure. In this embodiment, in the downstream from the compulsory neutralization device 93, a knurling roller pair 94 is disposed for providing knurling on both side edges of the film 82 by embossing processing. Inside the winding chamber 53, a winding shaft 95 for winding the film 82, and a press roller 96 for controlling the tension at the time of winding are disposed.

Figure 3:
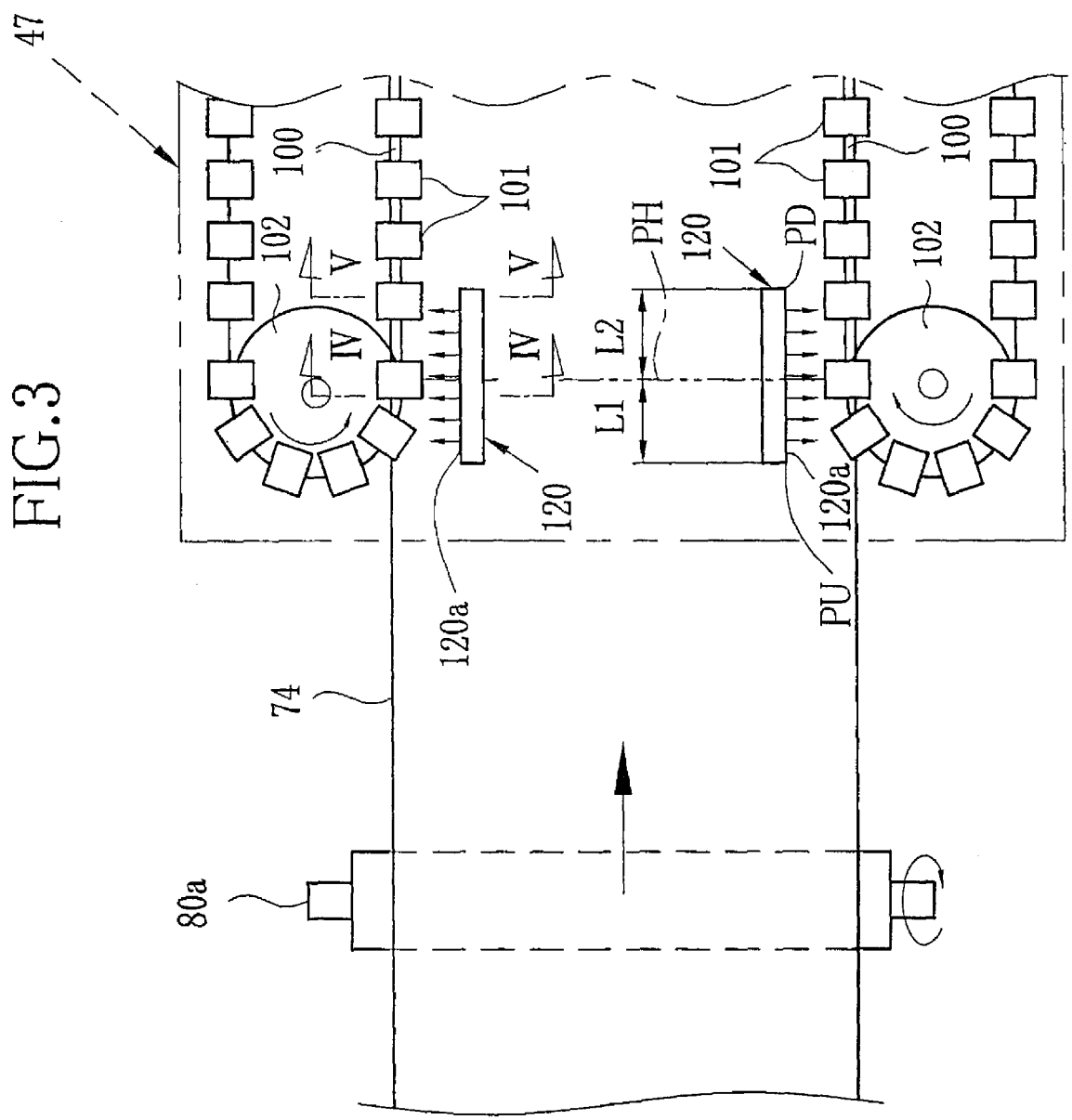
FIG. 3 is a schematic view of the vicinity of the tenter device of the present invention.

In FIG. 3, the tenter device 47 is provided with plural tenter clips 101 connected by an endless chain 100 located on both side edges of the wet film 74 along the transporting passage. The chain 100 is bridged across a driving roller pair 102. Note that an illustration of a lower driving roller is omitted. The chain 100 is driven by the driving roller pair 102 to move continuously. The air nozzle 120 having an outlet 120a is disposed above each side edge portion of a clipping line PH. The clipping line PH is an imaginary line connecting the hold start positions in which the tenter clips 101 start to hold the side edges of the wet film 74. Note that the tenter clips are provided at symmetrical positions with respect to the transporting direction of the wet film 74, and hold the side edges of the wet film 74 concurrently.

The outlets 120a are disposed to face toward the side edges of the wet film 74. The outlet 120a is a slit extending approximately parallel to the transporting direction of the wet film 74. It is also possible to align plural short-length slits in a lengthwise direction of the outlet 120a. When W1 represents a slit width, W1 is in a range of 0.5 mm to 5 mm, which enables the outlet 120a to efficiently blow the air onto the curls formed in the side edge portion of the wet film 74, as will be described later. The curls are approximately flattened before the side edges are held by the tenter clips 101. Note that the details of flattening the curls will be described later.

The wet film 74 is dried in the transporting section 80 while being supported by the rollers 80a. Then, the wet film 74 is transported to the tenter device 47. At the clipping line PH inside the tenter device 47, the both side edges of the wet film 74 are held by the tenter clips 101, and the wet film 74 is dried while being transported by the movement of the chains 100. Above the tenter clips 101, a fan duct having a dry air nozzle is disposed (not shown). The wet film 74 is dried by supplying the dry air through the dry air nozzle.

In the present invention, before the tenter clips 101 hold the both side edges of the wet film 74, the air is blown onto the both side edges from the outlets 120a. L1 represents a distance between the clipping line PH and a point PU which is an upstream end of the outlet 120a in the transporting direction of the wet film 74. The distance L1 takes a value in a range of 10 mm to 500 mm. L2 represents a distance between the clipping line PH and a point PD which is the downstream end of the outlet 120a in the transporting direction of the wet film 74. The distance L2 takes a value in a range of 0 mm to 200 mm.

Figure 4:
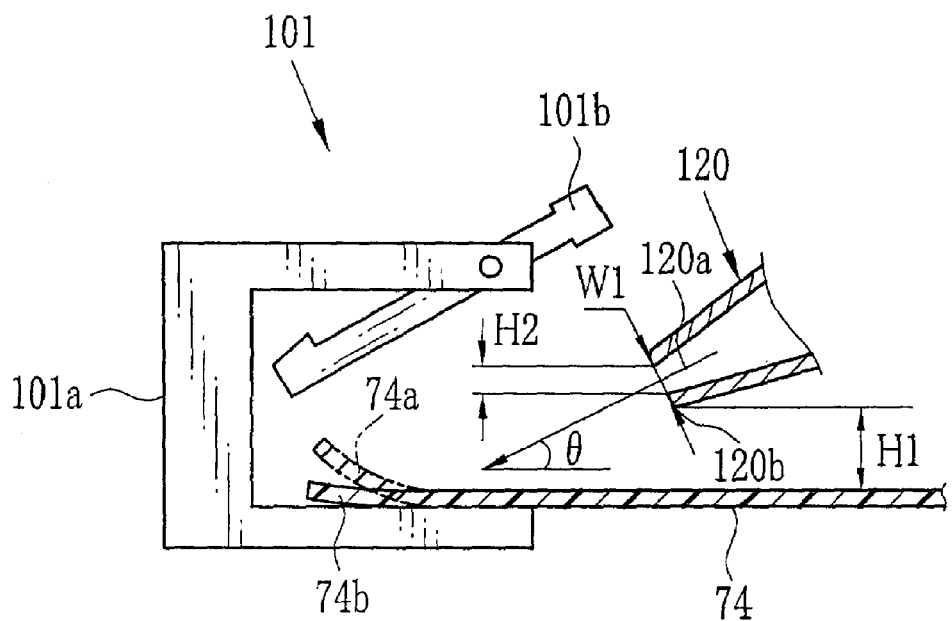
FIG. 4 is a cross-sectional view taken along a line IV-IV of FIG. 3.

In FIG. 4, as described above, air is blown from the outlet 120a to each of curled portions 74a in the side edges of the wet film 74 such that the air presses against the curled portion 74a. Thereby, the curled portion 74a is flattened and become an approximately flat portion 74b. The air is efficiently blown onto the curled portion 74a by placing the air nozzle 120 such that a height H1 of the air nozzle 120 and an air blow angle θ satisfy the predetermined ranges.

To be more specific, the outlet 120a is placed such that the H1 is in a range of 5 mm to 50 mm. The height H1 is a distance between the wet film 74 and the lower end 120b of the outlet 120a. More preferably, the height H1 is in a range of 7 mm to 30 mm. If the height H1 exceeds 50 mm, the air supplied from the outlet 120a is dispersed so that the effect of approximately flattening the curls is reduced. On the other hand, if the height H1 is less than 5 mm, a distance between the outlet 120a and the wet film 74 is too close that the outlet 120a and the wet film 74 may come into contact with each other, which is not preferable.

The air blowing angle θ between a direction of the air blown from the outlet 120a and the surface of the wet film 74 is adjusted in a range of 17° to 60°. It is more preferable that θ is in a range of 20° to 40°. It is especially preferable that θ is in a range of 25° to 35°. If the air blowing angle θ exceeds 60°, it becomes difficult to efficiently blow the air onto the curled portion 74a. On the other hand, if the air blowing angle is less than 17°, a pressure in an area below the air nozzle 120 is reduced. As a result, the wet film 74 is adhered to the outlet 120a of the air nozzle 120 by the suction of the air nozzle 120.

H2 represents a width of the outlet 120a vertical to the transporting direction of the wet film 74. The width H2 satisfies a range of 0.5 mm to 5 mm. the air from the outlet 120a satisfying the above width H2 is accurately aimed at the curled portion 74a while preventing the dispersion of the air. If the width H2 exceeds 5 mm, the wet film 74 may be adhered to the outlet 120a by the suction of the air nozzle 120. On the other hand, if the H2 is less than 0.5 mm, the outlet 120a becomes too small that the air velocity becomes too low. As a result, the effect of approximately flattening the curled portion 74a is reduced.

Figure 5:
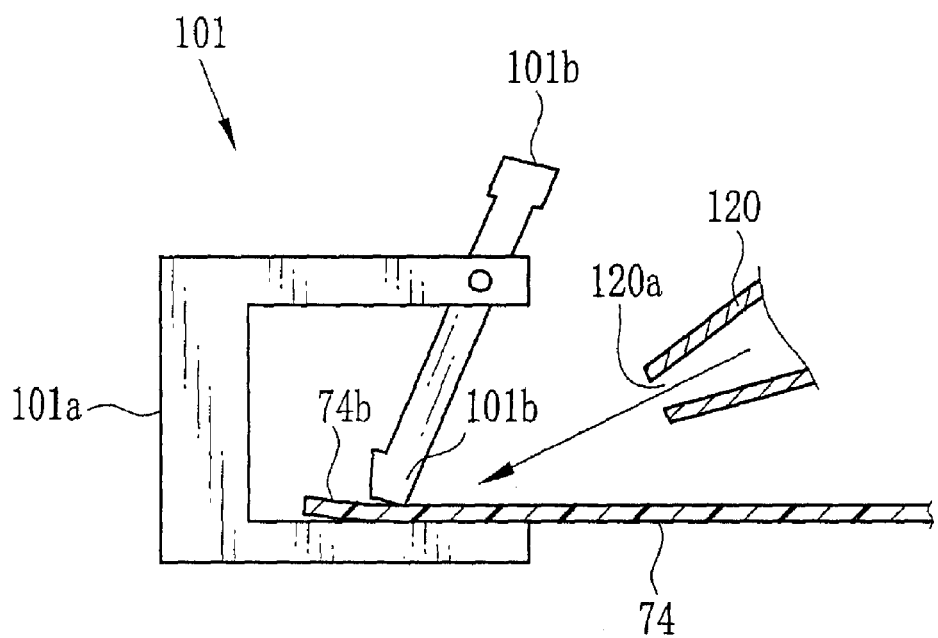
FIG. 5 is a cross-sectional view taken along a line V-V of FIG. 3.

In FIG. 5, when the both side edges of the wet film 74 reach the clipping line PH, each of the approximately flat portions 74b is clipped between a clip body 101a and a swingable pressing bar 101b. Since the both side edges of the wet film 74 have become approximately flat portions 74b, the wet film 74 is held by the tenter clips 101 without the holding defects such as foldings and ruptures. Moreover, since the wet film 74 is securely clipped between the clip body 101a and the swingable pressing bar 101b, the stability of transporting the wet film 74 is improved.

Figure 6A:
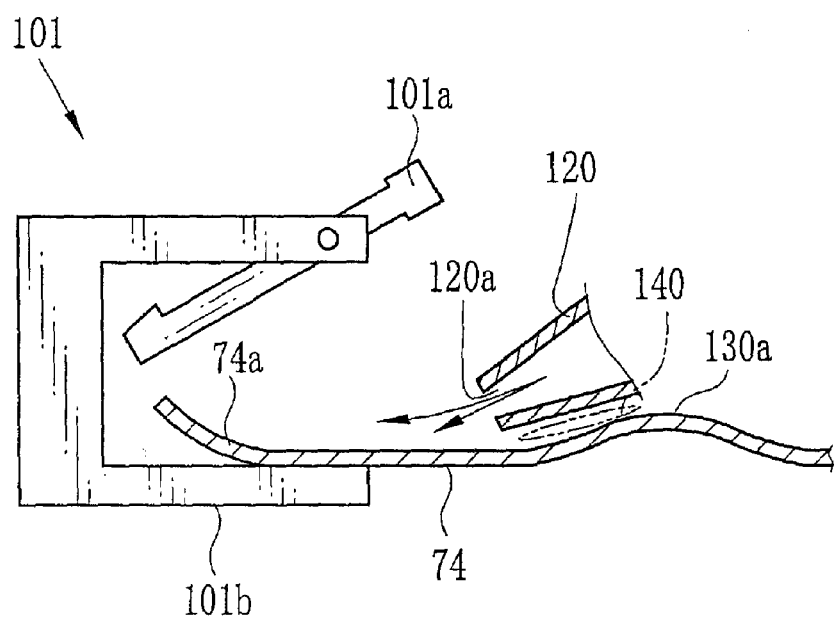
FIG. 6A is an explanatory view of a decompressed area below an air nozzle causing suction of a film by the air nozzle.
Figure 6B:
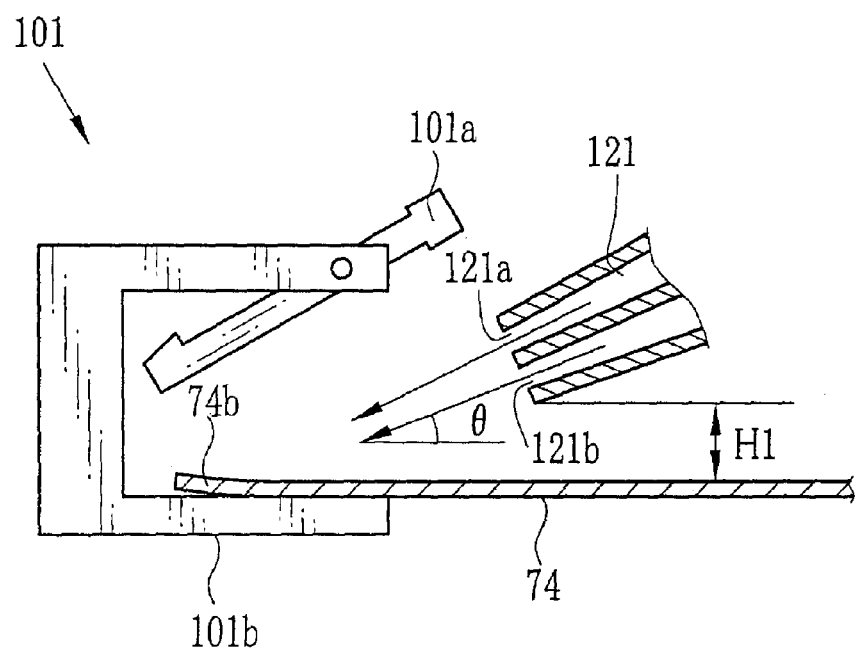
FIG. 6B is a schematic diagram in the case dual air nozzles are used as the air nozzle.

However, as shown in FIG. 6A, the pressure of the area below the air nozzle 120 may be reduced when the air is supplied from the outlet 120a (the area is referred to as a decompressed area 140). As a result, a part (74c) of the wet film 74 is adhered to the outlet 120a, which is referred to as adhesion of the wet film 74 and the outlet 120a by the suction of the air nozzle 120. The adhesion causes the fluctuations of the wet film 74, which is not preferable. To prevent the adhesion of the wet film 74 and the outlet 120a, as shown in FIG. 6B, dual air nozzles 121 having two outlets 121a and 121b is used. The dual air nozzles 121 reduce the formation of the decompressed area 140 below the dual air nozzles 121 to prevent the adhesion of the wet film 74 and the outlet 120a.

In the present invention, the air velocity V of the air supplied from each of the outlets 120a, 121a and 121b is in a range of 30 m/sec to 100 m/sec, and more preferably in a range of 50 m/sec to 80 m/sec. An especially preferable range is from 60 m/sec to 72 m/sec. The excellent flattening effect is obtained by blowing the air satisfying the above air velocity V onto the curled portion 74a of the wet film 74. If the air velocity V exceeds 100 m/sec, it causes the adhesion of the wet film 74 and the outlet 120a, which is not preferable. On the other hand, if the air velocity V is less than 30 m/sec, the air velocity V is excessively low that the curled portion 74 cannot be flattened.

In the case the air nozzle has plural outlets such as the dual air nozzles, it is possible to change the air velocity of the air supplied from each of the outlets while checking the degree of flattening of the curled portion 74a. In using the dual air nozzles, the height H1 and the air blowing angle θ satisfy the same ranges as above so that the descriptions thereof are omitted.

In this embodiment, a configuration in which one single or dual air nozzles 120 or 121 are disposed in the tenter device 47 is described. However, the number and the type of the air nozzles are not limited to the above. For instance, it is possible to use plural air nozzles each having the outlet of a predetermined width (not shown). Such plural air nozzles are disposed above each of the side edges of the wet film 74 in the transporting direction. It is preferable to align the plural nozzles with the constant spacing along the transporting direction of the wet film 74. It is preferable to change the air velocity V of the air supplied from each of the air nozzle so as to enhance the effect of approximately flattening the curled portion 74a of the wet film 74.

Next, an example of the method for producing the film 82 using the above described film production apparatus 40 is described. However, the present invention is not limited to this example.

The dope 27 is constantly kept uniform by the rotation of the stirrer 61. It is possible to add the additives such as the plasticizer, the UV absorbing agent and the like to the dope 27 during the stirring. The dope 27 is fed to the third filtration device 42 through the pump 62 and filtered. Then, the dope 27 is cast onto the belt 47 from the casting die 43. It is preferable that the rollers 44 and 45 are driven so as to adjust the tension of the belt 46 in a range of $10^4$ N/m and $10^5$ N/m. Moreover, a relative speed difference between the belt 46 and the rollers 44 and 45 are adjusted to be 0.01 m/min or less. Preferably, speed fluctuation of the belt 46 is 0.5% or less, and meandering thereof caused in a width direction while the belt 46 makes one rotation is 1.5 mm or less. In order to control the meandering, it is more preferable to provide a detector (not shown) and a position controller (not shown). The detector detects the positions of both sides of the belt 46. The position controller controls the position of the belt 46 by a feedback control according to a measurement value of the detector. At a portion of the belt 46 located directly below the casting die 43, it is preferable that vertical positional fluctuation caused by the rotation of the roller 45 is adjusted to be 200 μm or less. Further, it is preferable that the temperature in the casting chamber 64 is adjusted in a range of −10° C. to 57° C. by the temperature controlling device 65. The solvent vapor in the casting chamber 64 is collected by the recovery device 67 and is refined and reused as the dope for preparing the solvent.

In the case the dope 27 is cast from the casting die, the dope 27 is referred to as the casting bead between the casting die 43 and the belt 46. The casting film 69 is formed on the belt 46. At the casting, the temperature of the dope 27 is preferably in a range of −10° C. to 57° C. In order to stabilize the casting bead, it is preferable that the upstream area from the casting bead in the transporting direction of the belt 46 is decompressed by the decompression chamber 68 to achieve a predetermined pressure value. Preferably, the upstream area from the casting bead is decompressed by a range of 2000 Pa to 10 Pa relative to the downstream area from the casting bead. Moreover, it is preferable that a jacket (not shown) is attached to the decompression chamber 68 to maintain the inside temperature at a predetermined value. The temperature inside the decompression chamber 68 is not particularly limited. However, it is preferable to set the temperature higher than the condensation temperature of the organic solvent. Further, it is preferable to attach a suction unit (not shown) to edge portions of the casting die 43 in order to keep the casting bead in a desirable shape. A preferable range of air volume removed from the edge portions by the suction is 1 L/min to 100 L/min. The evaporation of the solvent is promoted by blowing dry air from the fan duct 70 onto the casting film 69 transported by the belt 46.

After the casting film 69 has possessed a self-supporting property, the casting film 69 is peeled off as the wet film 74 from the belt 46 while being supported by the roller 75. Next, the wet film 74 is carried along the transporting section 80 having the plural rollers 80a to the tenter device 47. In the transporting section 80, dry air of a desired temperature is sent from the air blower 81 to the wet film 74 to promote drying of the wet film 74. At this time, it is preferable that the temperature of the dry air is in a range of 20° C. to 250° C. In the transporting section 80, it is possible to give a draw tension to the wet film 74 by setting a rotation speed of the downstream roller higher than that of the upstream roller.

At the time of peeling, it is preferable that the remaining solvent in the wet film 74 is in a range of 10 mass % to 200 mass % with respect to the whole solid content on the dry basis. The remaining solvent is calculated by a mathematical expression $\{(x-y)/y\} \times 100$, when x is a weight of a sampling film, and y is a weight of the dried sampling film. The percentage of the remaining solvent on the dry basis is the percentage when the weight of the dope completely dried and solidified is considered as 100%.

The wet film 74 is transported to the tenter device 47. The air is blown from the outlet 120a of the air nozzle 120 provided in the proximity of the clipping line PH to each of the side edges of the wet film 74 to press against the curled portion 74a of the wet film 74 such that the curled portion 74a becomes the approximately flat portion 74b. Next, the approximately flat portion 74b is held by the clip 101 and the wet film 74 is dried while being transported through the tenter device 47. At this time, it is preferable to divide the tenter device 47 into plural sections so as to adjust the drying condition in each section. It is also possible to stretch the wet film 74 in the width direction by the use of the tenter device 74. It is preferable to stretch the wet film 74 in at least one of the casting direction and the width direction in a range of 0.5% to 300% in at least one of the transporting section 80 and the tenter device 47.

The wet film 74 is dried in the tenter device 47 until the remaining solvent reaches the predetermined value. Thereafter, the wet film 74 is transported out of the tenter device 47 as the film 82. At this time, the both side edges of the film 82 are cut off by the edge slitting device 50. The cut side edges are sent to the crusher 90 by the use of the cutter blower (not shown) and shredded into chips. The chips can be reused for the dope preparation which is effective in terms of production cost. The slitting process for the film side edges may be omitted. However, it is preferable to perform the slitting process between the casting process and the film winding process.

The film 82 whose side edges are cut off is transported to the drying chamber 51 and further dried. The temperature in the drying chamber 51 is not particularly limited. However, it is preferable to keep the temperature in the drying chamber in a range of 50° C. to 160° C. In the drying chamber 51, the film 82 is transported while being bridged across the rollers 91. The solvent vapor evaporated from the film 82 is adsorbed and recovered by the adsorbing device 92. Thus, the air from which the solvent is removed is reused as the dry air in the drying chamber 51. The drying chamber 51 is preferably divided in plural sections for changing the drying temperature in each section. To prevent the abrupt increase of the temperature of the film 82 in the drying chamber 51, the predrying chamber (not shown) can be provided between the edge slitting device 50 and the drying chamber 51 to predry the film 82. Thereby, it becomes possible to further prevent the changes in shapes and conditions of the film 82.

The film 82 is cooled to approximate room temperature in the cooling chamber 52. It is preferable to provide the humidification chamber (not shown) between the drying chamber 51 and the cooling chamber 52. In the humidification chamber, it is preferable that the air with the appropriate temperature and humidity is blown onto the film 82. Thereby, it becomes possible to prevent the curling and winding defects of the film 82.

The charged voltage of the film 82 during transporting is adjusted in the predetermined range (for instance, −3 kV to +3 kV) by the use of the compulsory neutralization device (neutralization bar) 93. In FIG. 2, the compulsory neutralization device 93 is installed downstream from the cooling chamber 52. However, the installation position is not limited to the configuration illustrated in FIG. 2. Further it is preferable to install the knurling roller pair 94 to provide the knurling on the both side edges of the film 82 by the embossing processing. It is preferable that the height or depth of each of the projections or depressions is in a range of 1 μm to 200 μm.

Lastly, the film 82 is wound by the winding shaft 95 in the winding chamber 53. It is preferable to apply the proper tension to the film 82 by the use of the press roller 96 during the winding. It is preferable to gradually change the tension from the start to the end of the winding. The length of the film 82 to be wound is preferably at least 100 m in the lengthwise direction (casting direction), and a width thereof is preferably at least 600 mm, and more preferably in a range of 1400 mm to 1800 mm. The present invention is also effective in the case the width exceeds 1800 mm. Note that the thickness of the product film should be in a range of 30 μm to 300 μm.

In the solution casting method of the present invention, it is also possible to simultaneously or sequentially co-cast two or more sorts of dopes. It is also possible to combine the simultaneous and sequential co-casting of the dopes. In the simultaneous co-casting, the casting die with a feed block or a multi-manifold type casting die can be used. In a multilayer film formed by the co-casting, it is preferable that one of two surface layers of the multilayer film preferably occupies in a range of 0.5% and 30% of the whole film thickness. Further, in the simultaneous co-casting, at the time of casting the dope 27 from the die slit, it is preferable that the higher viscosity dope covers over the low viscosity dope. Further, in the casting bead formed between the die slit and the support, it is preferable that the dope contacting the air has a higher composition ratio of the alcohol than that of the inner dope.

Note that paragraphs from [0617] to [0889] of Japanese Patent Application No. 2005-104148 describe in detail the structure of the casting die, the decompression chamber and the support, co-casting method, the peeling method, the stretching method, the drying condition in each process, a handling method, curling, a winding method after the correction of planarity, a recovering method of the solvent, a recovering method of film, and the like. The above descriptions can be applied to the present invention.

[Properties and Measuring Method]
(Degree of Curl and Thickness)

The properties of the wound cellulose acylate film and the measuring method thereof are disclosed in paragraphs [0112] to [0139] of Japanese Patent Laid-Open Publication No. 2005-104148. The above descriptions can be applied to the present invention.

[Surface Treatment]

It is preferable to perform the surface treatment to at least one of the surfaces of the cellulose acylate film. At least one of vacuum glow discharge, plasma discharge under the atmospheric pressure, UV-ray irradiation, corona discharge, flame treatment, acid treatment and alkali treatment is preferably performed as the surface treatment.

[Functional Layer]
(Antistatic Layer, Hardened Layer, Antireflection Layer, Easily Adhesive Layer and Antiglare Layer)

At least one of the surfaces of the cellulose acylate film may be primed.

It is preferable to use the cellulose acylate film as a base film and form functional layers thereon to be used as the functional material. It is preferable that the functional layer has at least one of an antistatic layer, a cured resin layer, an antireflection layer, an easily adhesive layer, an antiglare layer and an optical compensation layer.

The above functional layers preferably contain at least one sort of surfactants in the range of 0.1 mg/m$^2$ to 1000 mg/m$^2$. Further, the functional layers preferably contain at least one sort of lubricating agents in the range of 0.1 mg/m$^2$ to 1000 mg/m$^2$. The functional layers preferably contain at least one sort of matting agents in the range of 0.1 mg/m$^2$ to 1000 mg/m$^2$. The functional layers preferably contain at least one sort of antistatic agents in the range of 1 mg/m$^2$ to 1000 mg/m$^2$. Conditions and methods for forming the surface functional layers for achieving the various functions and properties in the cellulose acylate film are described in detail from paragraphs [0890] to [1087] of Japanese Patent Laid-Open Publication No. 2005-104148, which can be applied to the present invention.

(Various Uses)

The cellulose acylate film is especially useful as the protective film for a polarizing filter. To produce the LCD device, two polarizing filters are disposed so as to sandwich a liquid crystal layer. Each polarizing filter has the cellulose acylate film adhered to a polarizer. Note that the configuration of the liquid crystal layer and the polarizing filters are not limited to the above example and other known configurations can be used. Japanese Patent Laid-Open Publication No. 2005-104148 (for instance, paragraphs from [1088] and [1265]) discloses TN type, STN type, VA type, OCB type, reflection type, and other examples of the LCD devices in detail. These types can be applied to the present invention. Further, the above reference teaches the cellulose acylate film provided with an optical anisotropic layer and that provided with anti-reflective and antiglare functions. Further, the above reference discloses to provide the cellulose acylate film with proper optical functions to obtain a biaxial cellulose acylate film used as the optical compensation film. The optical compensation film also serves as the protective film in the polarizing filter. The above descriptions can be applied to the present invention.

According to the present invention, it is also possible to obtain cellulose triacetate film (TAC film) excellent in optical properties. The TAC film can be used as the protective film in the polarizing filter and the base film for the photosensitive material. Further, the TAC film can be used as an optical compensation film for widening a view angle of the LCD device used for the television and the like. In particular, the TAC film is effective in the application where the TAC film serves as the optical compensation film and also as the protective film of the polarizing filter. Accordingly, the TAC film can be used for an IPS mode, an OCB mode, a VA mode and the like as well as for a conventional TN mode. Further, it is also possible to configure the polarizing filter using the above protective film in the polarizing filter.

Hereinafter, concrete examples of the present invention are described. However, the present invention is not limited to these examples. The producing methods and conditions are described in detail only in example 1.

Example 1

The examples of the present invention are described below. Composition of the polymer solution (the dope) used for producing the film is as follows.

[Composition]

| | |
|---|---|
| Cellulose Triacetate (powder: degree of substitution, 2.84; viscosity-average degree of polymerization, 306; water content, 0.2 mass %; viscosity of 6 mass % dichloromethane solution, 315 mPa · s; average particle diameter, 1.5 mm; standard deviation of particle diameter, 0.5 mm) | 100 pts. mass |
| Dichloromethane (first solvent compound) | 320 pts. mass |
| Methanol (second solvent compound) | 83 pts. mass |
| 1-butanol (third solvent compound) | 3 pts. mass |
| Plasticizer A (triphenylphosphate) | 7.6 pts. mass |
| Plasticizer B (diphenylphosphate) | 3.8 pts. mass |
| UV-agent A 2(2'-hydroxy-3',5'-di-tert-butylphenyl) benzotriazol | 0.7 pts. mass |
| UV-agent B 2(2'-hydroxy-3',5'-di-tert-amylphenyl)-5-chlorobenzotriazol | 0.3 pts. mass |
| Mixture of citric acid esters (mixture of citric acid, citric acid monoethyl ester, citricacid diethyl ester, citric acid triethyl ester) | 0.006 pts. mass |
| Particles (silicon dioxide: average particle diameter, 15 nm; Mohs hardness, approx. 7) | 0.05 pts. mass |

[Cellulose Triacetate]

Cellulose triacetate used in this example contains the following: remaining content of acetic acid is 0.1 mass % or less, the Ca content is 58 ppm, the Mg content is 42 ppm, the Fe content is 0.5 ppm, the free acetic acid is 40 ppm, and the sulfuric ion content is 15 ppm. The degree of acetylation at $6^{th}$ position is 0.91, and the percentage of acetyl groups at $6^{th}$ position to the total acetyl groups is 32.5%. The acetone extract in which TAC is extracted by acetone is 8 mass %, and a ratio of weight-average molecular weight to number-average molecular weight is 2.5. Further, yellow index is 1.7, haze is 0.08, and transparency is 93.5%. Tg (glass transition temperature) measured by DSC is 160° C., and calorific value in crystallization is 6.4 J/g. This cellulose triacetate is synthesized from cellulose obtained from cotton. Hereinafter, the above TAC is referred to as cotton-derived TAC in the following explanation.

The dope 27 is prepared by the use of the dope production apparatus 10 shown in FIG. 1. The above solvent compounds are mixed and stirred in the 4000 L stainless mixing tank 12 having the stirring blade to prepare the solvent mixture. Note that the water content in each solvent compound is 0.5 mass % or less. Next, the TAC powder is gradually dispensed from the hopper 13 to the mixing tank 12, and stirred and dispersed for 30 minutes by using the second stirrer 24 of the eccentric stirring shaft of the dissolver type at the circumferential velocity of 5 m/sec, and the first stirrer 22 having the anchor blade attached to the shaft at the circumferential velocity of 1 m/sec. The temperature is 25° C. at the start of the dispersion, and 48° C. at the end of the dispersion.

Then, the previously prepared additive solution is dispensed from the additive tank 14 to the mixing tank 12 while adjusting the dispensing amount by the valve 19 until the total amount in the mixing tank 12 reaches 2000 kg. The high-speed stirring is stopped after the additive solution is dispersed. After that, stirring by the anchor blade of the first stirrer 22 is continued for 100 minutes at the circumferential velocity of 0.5 m/sec. Thereby, the swelling liquid 25 is obtained by swelling the TAC flakes. Until the end of the swelling, the inner pressure of the mixing tank 12 is increased to 0.12 MPa with use of nitrogen gas. At this time, the hydrogen concentration in the mixing tank 12 is less than 2 vol. %, which does not cause the explosion. Further, water content in the swelling liquid 25 is 0.3 mass %.

The swelling liquid 25 is fed from the mixing tank 12 through the pump 26 to the heater 15 which is the tube with the jacket, and heated to 50° C., and thereafter heated under the application of pressure at 2 MPa to 90° C. Thereby, the swelling liquid 25 is dissolved completely. The heating time is 15 minutes. The temperature of the swelling liquid 25 is decreased to 36° C. by the temperature controlling device 16, and then filtrated through the first filtration device 17 having the filter whose nominal diameter is 8 µm. Thereby, the dope (hereinafter referred to as a dope before concentration) is obtained. The pressure in the upstream of the first filtration device 17 is 1.5 MPa and that in the downstream is 1.2 MPa. The filter and the tube exposed to the high temperature are made of Hastelloy (Registered trademark).

The dope before concentration is fed to the flash device 30 kept at the atmospheric pressure at 80° C. to perform flash evaporation to obtain the dope 27. The solvent vapor is recovered by the condenser. The solid content in the dope 27 after the flashing is 21.8 mass %. The condensed solvent is recovered by the recovering device 32 and refined in the refining device 33. Thereafter, the refined solvent is sent to the solvent tank 11 and reused for the dope preparation. In the recovery device 32 and the refining device 33, distillation and dehydration are carried out. In the flash tank of the flash device 30, the stirrer having the anchor blade (not shown) is provided, rotating at a circumferential velocity of 0.5 m/sec to remove the foams in the flashed dope. A temperature of the dope 27 in the flash tank is 25° C. An average residence time of the dope in the tank is 50 minutes. A shear viscosity of the extracted dope 27 is 450 Pa·s measured at 25° C. at a shear rate of 10 (second$^{-1}$).

Next, the foams are removed by irradiating weak ultrasonic waves to the dope 27. Thereafter, the dope 27 is fed to the second filtration device 31 using the pump 34 while applying pressure of 1.5 MPa to the dope 27. In the second filtration device 31, the dope 27 is passed through a sintered metal fiber filter with a nominal pore diameter of 10 μm, and then the other sintered metal fiber filter of the same size (a nominal pore diameter of 10 μm). Pressures in the upstream of the sintered metal fiber filters are 1.5 MPa and 1.2 MPa respectively. Pressures in the downstream of the sintered metal fiber filters are 1.0 MPa and 0.8 MPa respectively. The temperature of the dope 27 after the filtration is kept at 36° C. and stored in the 2000 L stainless steel stock tank 41. In the stock tank 41, the dope 27 is constantly stirred by the stirrer 61 having the anchor blade on the center axis at the circumferential velocity of 0.3 m/sec.

The film 82 is produced by using the film production apparatus 40 as shown in FIG. 2. The dope 27 in the stock tank 41 is fed to the third filtration device 42 through the high accuracy gear pump 62 having a function to increase the upstream pressure. A feedback control to the upstream from the gear pump 62 is carried out by the inverter motor so as to keep the upstream pressure at 0.8 MPa. The high accuracy gear pump 62 has the following performance capabilities: the volume efficiency is 99.2%, and the fluctuation ratio of discharge amount is 0.5% or less. The discharge pressure is 1.5 MPa. The dope 21 which has passed through the third filtration device 42 is fed to the casting die 43.

The casting die 43 is 1.8 m in width. The casting is carried out while adjusting the flow volume of the dope 27 such that the dried film has the thickness of 80 μm. Further, the casting width of the dope 27 discharged from the outlet of the casting die 73 is 1700 mm. To regulate the temperature of the dope 27 at 36° C., the jacket (not shown) is attached to the casting die 43 to supply the heat transfer medium inside the jacket. The casting die 43 and the pipes through which the dope 27 passes are insulated at 36° C. during the casting. The casting die 43 is of a coathanger type. Further, the casting die 43 is provided with bolts (heat bolts) at 20 mm pitch for adjusting the thickness of the film, and equipped with the automatic thickness control mechanism using the heat bolts. The heat bolts enable to set the profile according to the flow volume of the high-precision gear pump 62 based on the previously set program and to carry out the feedback control based on the adjustment program according to the profile of the thickness gauge such as the infrared thickness gauge (not shown) disposed on the film production apparatus 40. Except for the casting edge portions (the portions having a width of 20 mm from the side edges of the film), a difference in thickness of the film between two points 50 mm apart from each other is preferably adjusted within 1 μm, and the variation of the thickness in the widthwise direction is adjusted to be 3 μm or less. Further, the thickness variation in the entire film is adjusted to be ±1.5% or less.

In the upstream from the casting die 43 in the support moving direction, the decompression chamber 68 is disposed. The decompression degree of the decompression chamber 68 is adjusted such that the pressure difference between the upstream and downstream areas from the casting bead with respect to the transporting direction is in a range of 1 Pa to 5000 Pa depending on the casting speed. Further, the pressure difference between the upstream and downstream areas from the casting bead is set such that the length of the casting bead is in a range of 20 mm to 50 mm. The decompression chamber 68 has the mechanism to set the temperature thereof higher than the condensing temperature of the gas around the casting section. Labyrinth packing (not shown) is provided in each of the upstream and downstream sides of the outlet of the casting die 43. An opening is provided in each side edge of the outlet. Further, an edge suction device (not shown) is provided to the casting die 43 for controlling the position fluctuations in the side edges of the casting bead.

The material of the casting die 43 is the precipitation hardened stainless steel. The material had coefficient of thermal expansion of at most 2×10$^{-5}$ (° C.$^{-1}$) The finish precision of a contacting surface of the casting die 43 is 1 μm/m or less, and the straightness is 1 μm/m or less in any direction. The clearance of the slit is controlled at 1.5 mm. The lip ends of the casting die 43 are provided with the hardened layer formed by the tungsten carbide (WC) coating using the spraying method.

The corners of the contacting portion of each lip to the dope are processed so as to have the chamfered radius of 50 μm or less through the slit.

The dope 27 discharged from the casting die 73 may be partially dried and becomes solid at the slit. In order to prevent the solidification of the dope 27, the solvent mixture A (the mixture of dichloromethane 86.5 pts. mass, methanol 13 pts. mass, and 1-butanol 0.5 pts. mass) which solubilizes the dope 27 is supplied to the interface between each of the side edges of the casting bead and the slit at 0.5 ml/min. The pulsation of the pump for supplying the solvent A is 5% or less. By the use of the decompression chamber 68, the pressure of the upstream area from the casting bead with respect to the transporting direction is lowered by 150 Pa from that of the downstream area. The jacket (not shown) is attached to the decompression chamber 68. The temperature of the decompression chamber 68 is controlled by supplying the heat transfer medium kept at 35° C. inside the jacket. The edge suction device is capable of adjusting the edge suction flow volume in a range of 1 L/min to 100 L/min. In this embodiment, the edge suction flow volume is properly adjusted in a range of 30 L/min to 40 L/min.

The dope 27 is cast onto the belt 46 disposed in the casting chamber 64 having an air pressure controller (not shown). The belt 46 is the endless belt having the length of 70 m, the width of 2.1 m and the thickness of 1.5 mm made of SUS 316 stainless polished to make the surface roughness 0.05 μm or less. The thickness unevenness of the entire belt 46 is 0.5% or less. The belt 46 is driven by the rollers 44 and 45. The tension of the belt 46 in the transporting direction is adjusted to be 1.5×10$^5$ N/m$^2$. The relative difference in the rotation speed of the belt 46 to the rollers 44 and 45 is adjusted to be 0.01 m/min or less. The speed fluctuation of the belt 46 is adjusted to be 0.5% or less. Further, the both edge positions of the belt 46 are detected so as to adjust the meandering in the width direction in one rotation 1.5 mm or less. The position fluctuations in the vertical direction between the lip end directly below the casting die 43 and the belt 46 are adjusted to be 200 μm or less.

The heat transfer medium is supplied inside the rollers 44 and 45 to adjust the temperature of the belt 46. The heat transfer medium at 40° C. is supplied inside the roller 44 for drying. On the other hand, the heat transfer medium at 5° C. is supplied inside the roller 45. The surface temperature of the center portion of the belt 46 just before the casting is 15° C. The temperature difference between the center portion and the both side edges of the belt 46 is 6° C. or less. The belt 46 with no surface defects is used. Concretely, the number of pin holes whose diameter is not less than 30 μm is preferably zero.

The number of pinholes whose diameter is not less than 10 μm and less than 30 μm is preferably 1 or less per 1 m². The number of pinholes whose diameter is less than 10 μm is 2 or less per 1 m². The temperature of the casting chamber 64 is kept at 35° C. by the use of the temperature controlling device 65. To dry the casting film 69, first, the dry air is blown parallel to the casting film 69 on the belt 46. The overall heat transfer coefficient from the dry air to the casting film 69 is 24 kcal/(m²·hour·° C.).

The fan duct 70 is installed above the belt 46 in the upstream side with respect to the transporting direction of the belt 46. The casting film 69 is dried by supplying the dry air at 135° C. from the fan duct 70. The oxygen concentration in the drying atmosphere on the belt 46 is kept at 5 vol. % by substituting the nitrogen gas for air. The solvent vapor inside the casting chamber 64 is condensed and recovered by setting the outlet temperature of the condenser 66 at −10° C.

The casting film 69 is peeled off as the wet film 74 from the belt 46 at the time the remaining solvent in the casting film 69 reaches 50 mass. %, and then the wet film 74 is supported by the roller 75. The peeling tension is 1×10² N/m². In order to reduce the peeling defects, the percentage of the peeling speed (the draw of the peel roller) to the speed of the belt 46 is controlled from 100.1% to 110%. The surface temperature of the wet film 74 is 15° C. The solvent vapor is condensed and liquefied by the condenser 66 controlled at −10° C. and recovered by the recovery device 67. Thus, the solvent is removed from the air such that the water content in the air becomes 0.5% or less. The air is heated and reused as the dry air. The wet film 74 is transported to the tenter device 47 through the plural rollers 80a of the transporting section 80. During the transportation, the wet film 74 is dried by supplying the dry air at 40° C. from the air blower 81 while the tension of approx. 30N is applied to the wet film 74 in the lengthwise direction of the wet film 74.

In the tenter device 47, the air nozzle 120 shown in FIG. 4 is used. The air nozzle 120 is disposed such that the height H1, that is, the distance between the wet film 74 and the lower end 120b of the outlet 120a is 10 mm, and an air blowing angle θ between the air blown from the outlet 120a and the surface of the wet film 74 is 30°.

Air is blown onto the curled portion 74a of the wet film 74 under the following conditions: the distance L1 between the clipping line PH and the point PU which is the upstream end (the air blow start position) of the outlet 120 in the transporting direction of the wet film 74 is 300 mm, the distance L2 between the clipping line PH and the point PD which the downstream end (the air blow end position) of the outlet 120 in the transporting direction of the wet film 74 is 150 mm, and the air velocity V of the air from the outlet 120a is 72 m/sec.

After forming the curled portions 74a into the approximately flat portions 74b, the both approximately flat portions are held by the tenter clips 101. In this state, The film 82 is stretched in the width direction while being transported. Inside the tenter device 47 is divided in three sections. The temperature in each section is 90° C., 110° C. and 120° C. from the upstream. The gas composition of the dry air is that of the saturated gas concentration at −10° C. The film 82 is dried such that the remaining solvent reaches 7 mass % at the outlet of the tenter device 47.

Inside the tenter device 47, the difference in the stretch ratios of the film 82 between two arbitrary points not less than 10 mm away from the hold start position is 10% or less, and between those 20 mm away from the hold start position is 5% or less. The percentage of the length between the hold start position and the clip end position with respect to the length between the inlet and the outlet of the tenter device 47 is 90%.

The outlet temperature of the condenser 66 is set at −8° C. The solvent vapor in the tenter device 47 is condensed and liquefied at −10° C. The water content in the condensed solvent is adjusted to be 0.5 mass % or less. Thereafter, the solvent is reused. The wet film 74 is transported out of the tenter device 47 as the film 82.

Within 30 seconds after the film 82 is transported out of the tenter device 47, both side portions having a width of 50 mm from the side edges of the film 82 are cut off by using the NT cutter used as the edge slitting device 50. The cut side edges are sent to the crusher 90 by the use of the cutter blower (not shown). The crusher 90 shreds the cut side edges into chips with average size of 80 mm². The chips are reused as the material of the dope preparation. The oxygen concentration in the drying atmosphere is kept at 5 vol % by substituting the nitrogen gas for the air in the tenter device 47. Before drying the film 82 in the drying chamber 51 at the high temperature which will be described later, the film 82 is predried in the predrying room (not shown) to which the dry air at 100° C. is supplied.

The film 82 is dried in the drying chamber 51 at the high temperature. The drying chamber 51 is divided into 4 sections. The dry air at 120° C., 130° C., 130° C. and 130° C. is supplied from the air blower (not shown) to the four sections. The tension 100 N/m is applied to the film 82 by the roller 91 while the film 82 is transported. The film 82 is dried for 10 minutes so as to reduce the remaining solvent to 0.3 mass %. Lap angles are 90° and 180°. The lap angle is an angle of a portion of the film 82 contacting the roller 91 (note that the lap angles are exaggerated in FIG. 2). The material of the roller 91 is aluminum or carbon steel, and the hard chrome plating is applied to the surface. The roller 91 with a flat surface and that with a mat-processed surface by blasting are used. The film position fluctuation caused by the rotation of the roller 91 is not more than 50 μm in each roller 91.

The solvent gas contained in the dry air is adsorbed by the adsorbing device 92. The adsorbing agent is an activated carbon. Desorption is carried out by the dry nitrogen. The water content of the recovered solvent is adjusted to be 0.3 mass % or less, and the recovered solvent is reused for the dope preparation. The dry air contains the plasticizer, the UV absorbing agent, and other compounds with high boiling points in addition to the solvent vapor. The above substances are removed from the dry air by the cooling device and the preadsorber. Then, the dry air is circulated and reused. The adsorption and desorption conditions are set such that the VOC (volatile organic compound) in the gas emission to the outside becomes 10 ppm or less. The amount of the solvent recovered by the condensing method occupies 90 mass % of all solvent vapor. Most of the remaining solvent vapor is recovered by the adsorption.

The dried film 82 is transported to the first humidification chamber (not shown). The dry air at 110° C. is supplied to the transporting section 80 between the drying chamber 51 and the first humidification chamber. The air at 50° C. and with the dew point of 20° C. is supplied to the first humidification chamber. Then, the film 82 is transported to the second humidification chamber (not shown) to prevent the curling of the film 82. In the second humidification chamber, the air at 90° C. with the humidity of 70% is directly blown onto the film 82.

After the humidification, the film 82 is cooled in the cooling chamber 52 to 30° C. or below. Then, the both side edges of the film are cut off for the second time by the edge slitting device (not shown). The compulsory neutralization device (neutralization bar) 93 is disposed to keep the charged voltage of the film 82 constantly in a range of −3 kV to 3 kV during the transportation. Knurling is provided to both side edges of the film 82 by the knurling roller pair 94. In each of the side edges of the film 82, embossing processing is applied to one of the surfaces of the film 82. The width to which the knurling is applied is 10 mm from both side edges of the film 82. The knurling pressure applied to the film 82 is set such that the embossing height is 12 μm larger in average than the average film thickness.

Lastly, the film 82 is transported to the winding chamber 53. Inside the winding chamber 53, the temperature is kept at 28° C. and the humidity is kept at 70%. An ionizer (not shown) is installed in the winding chamber 53 to keep the charged voltage in a range of −1.5 kV to +1.5 kV. The obtained film 82 has the thickness of 80 μm, and the width of 1475 mm. The total length of the wound-up film is 3940 m. The winding shaft 95 with the diameter of 169 mm is used. The tension at the start of the winding is 300N/m and the tension at the end of the winding is 200N/m. The position fluctuations (projections and retractions) of the side edges of the wound film 82 in the width direction on the winding shaft 95 (which may also be referred to as an oscillation width) is in a range of −5 mm to +5 mm. The above position fluctuations may periodically occur in every 400 m. The pressure of the press roller 96 applied to the winding shaft 95 is 50 N/m. At the time of the winding, the temperature of the film 82 is 25° C., the water content is 1.4 mass % and the remaining solvent is 0.3 mass %.

Example 2

The film 82 is produced under the same conditions (the same dope 27 and the same method) as those in Example 1 except that the film thickness is 40 μm.

Example 3

The film 82 is produced by using the same dope 27 and the same method as those in the Example 1. The air nozzle 120 equivalent to that in the Example 1 is installed in the tenter device 47. L1, L2 and H1 are the same as those in the Example 1. However, the air blowing angle θ is 50°. The air flow timing and the air velocity are the same as those in the Example 1.

Example 4

The film 82 is produced by using the same dope 27 and the same method as those in the example 1. The air nozzle 120 equivalent to that in the Example 1 is installed in the tenter device 47. L1, L2 and H1 are the same as those in the Example 1. However, the air blowing angle θ is 15°. The air flow timing and the air velocity are the same as those in the Example 1.

Example 5

The film 82 is produced by using the same dope 27 and the same method as those in the Example 1. The air nozzle 120 equivalent to that in the Example 1 is installed in the tenter device 47. L1, L2 and H1 are the same as those in the Example 1. However, the air blowing angle θ is set at 70°. The air flow timing and the air velocity are the same as those in the Example 1.

Example 6

The film 82 is produced by using the same dope 27 and the same method as those in the Example 1. The air nozzle 120 equivalent to that in the Example 1 is installed in the tenter device 47. L1, L2 and θ are the same as those in the Example 1. However, H1 is 3 mm. The air flow timing and the air velocity are the same as those in the Example 1.

Example 7

The film 82 is produced by using the same dope 27 and the same method as those in the Example 1. The air nozzle 120 equivalent to that in the Example 1 is installed in the tenter device 47. L1, L2 and θ are the same as those in the Example 1. However, H1 is 60 mm. The air flow timing and the air velocity are the same as those in the Example 1.

Example 8

The film 82 is produced by using the same dope 27 and the same method as those in the Example 1. The shape and conditions, installation condition and air flow timing of the air nozzle 120 are equivalent to those in Example 1. However, the air velocity V is adjusted to be 62 m/sec.

Example 9

The film 82 is produced by using the same dope 27 and the same method as those in the Example 1. The shape and conditions, installation condition and air flow timing of the air nozzle 120 are equivalent to those in Example 1. However, the air velocity V is adjusted to be 110 m/sec.

Example 10

The film 82 is produced by using the same dope 27 and the same method as those in the Example 1. The shape and conditions, installation conditions and air flow timing of the air nozzle 120 are equivalent to those in Example 1. However, the air velocity V is adjusted to be 20 m/sec.

Comparative Example

The film 82 is produced by using the same dope 27 and the same method as those in the Example 1. Note that in the tenter device 47, the air is not blown onto the both side edges of the wet film 74.

In the above Examples and a Comparative example, holding defects at the clipping line PH in the tenter device 47 are visually inspected and the degree of defects are evaluated. The film 82 is evaluated as A when the both side edges of the wet film 74 are held by clips without the holding defects such as foldings and ruptures. The film 82 is evaluated as B when there are slight holding defects which do not affect the film production. The film 82 is evaluated as C when there are some holding defects which do not affect the film production. The film 82 is evaluated as F when the curls are not flattened so that the film holders fail to hold the film side edges. The F is regarded as unsuitable for the film production. The condition of the film 82 is observed at around the exit of the tenter device 47.

Film producing conditions in the Examples and Comparative example, and evaluations of the produced films are indicated in Table 1 below. Note that in the Table 1, the Examples 1 to 10 are indicated as E1 to E10, and the Comparative example is indicated as C.Ex.

TABLE 1

| | Nozzle height H1(mm) | Air blowing angle θ (°) | Air velocity V (m/sec) | Holding defects | Remarks |
|---|---|---|---|---|---|
| E1 | 10 | 30 | 72 | A | Excellent efficiency in forming approximately flat side edges |
| E2 | 10 | 30 | 72 | A | |
| E3 | 10 | 50 | 72 | A | |
| E4 | 10 | 15 | 72 | C | Film is slightly adhered to the air nozzle. |
| E5 | 10 | 70 | 72 | C | Efficiency in forming approximately flat side edges is reduced. |
| E6 | 3 | 30 | 72 | C | Film slightly contacts with the air nozzle. |
| E7 | 60 | 30 | 72 | B | Film slightly fluctuates. |
| E8 | 10 | 30 | 62 | A | Transportation stability is excellent. |
| E9 | 10 | 30 | 110 | B | Film is adhered to the air nozzle. |
| E10 | 10 | 30 | 20 | C | Efficiency in forming approximately flat side edges is reduced. |
| C. Ex. | — | — | — | F | Film holders fail to hold film side edges. |

It is apparent from the Table 1 that in the Examples 1 to 10, although the slight holding defects may occur according to the air blowing conditions, the holding defects are reduced to the degree which does not affect the film production by blowing air onto both side edges of the wet film 74 using the air nozzle 120. In particular, the examples 1 to 3, and 8 showed excellent transportation stability without the occurrence of the holding defects.

Next, results of each of the examples and comparative example are explained in detail. In each of the Examples 3 to 5, the air blowing angle θ of the air blown from the outlet 120 is changed from that in the Example 1. There are differences in the occurrence of the holding defects. However, such holding defects are within the degrees not affecting the film production. In the Example 4, the holding defects occurred due to the adhesion of the wet film 74 and the outlet 120*a* by the suction of the air nozzle 120 during the air blow. In the Example 5, the curls are slightly remained. In other words, slight holding defects occurred due to reduction of efficiency in forming approximately flat side edges, which is evaluated as C. Causes of the above holding defects are as follows. In the Example 4, it is considered that the excessively small air blowing angle θ (15°) reduces pressure in the area below the air nozzle 120. Accordingly, the wet film 74 is adhered to the outlet 120*a*. In the Example 5, it is considered that due to the excessively large air blowing angle (70°), the air was not blown onto the curled portion 74*a* efficiently. Accordingly, the approximately flat portions were not formed.

In view of the results of the Example 1 and Examples 3 to 5, in the Examples 6 and 7, the air blowing angle is set at 30° and the air velocity V is set at 72 m/sec, which did not cause the holding defects. H1 is changed in each of the Examples 6 and 7. As a result, in the Example 6, the slight holding defects occurred (which is evaluated as C). In the Example 7, the wet film 74 slightly fluctuated, but the efficiency in forming the approximately flat side edges was excellent, which is evaluated as B. Causes of the above defects are as follows. In the Example 6, it is considered that an excessively small H1 (3 mm) causes the contact of the air nozzle 120 and the wet film 74. In the Example 7, it is considered that an excessively large H1 (60 mm) caused the dispersion of air blown from the outlet 120*a* such that the air is slightly blown onto the portions of the wet film 74 other than the curled portion 74*a*.

In view of the above results, in each of the Examples 8 to 10, the air velocity V is changed while H1 is fixed to 10 mm and the air blowing angle θ is fixed to 30°. Results are as follows. In the Example 8, the holding defects did not occur so that the efficiency in forming the approximately flat side edges was excellent (which is evaluated as A). In the Example 9, the wet film 74 is adhered to the air nozzle 120, but the efficiency in forming the approximately flat side edges was excellent (which is evaluated as B). In the Example 10, the slight holding defects occurred so that the efficiency in forming the approximately flat side edges was reduced (which is evaluated as C). Causes are as follows. In the Example 9, it is considered that the excessively high air velocity V (110 m/sec) reduces the pressure in the area below the air nozzle 120. Accordingly, the wet film 74 is adhered to outlet 120*a* by the suction of the air nozzle 120. In the Example 10, it is considered that an excessively low air velocity V 20 m/sec caused failures in approximately flattening the curled portions 74*a*.

In the comparative example in which the film 82 is produced without blowing the air onto the both side edges of the wet film 74, all the curls remained without being flattened. Accordingly, the film holders failed to hold the curled side edges of the wet film 74.

As described above, in the tenter device, before the both side edges of the wet film 74 are held by the tenter clips, the air is blown onto the both side edges (especially onto the curled portions thereof) at the predetermined velocity to form the approximately flat portions, preventing the holding defects. The installation position of the air nozzle is adjusted such that the height H1 from the surface of the wet film to the lower edge of the air nozzle, and the air blow angle satisfy the predetermined ranges. Thereby, the curls of the film are approximately flattened efficiently.

Various changes and modifications are possible in the present invention and may be understood to be within the present invention.

INDUSTRIAL APPLICABILITY

The present invention is applicable to the production of the polymer film used in optical applications such as the LCD.

The invention claimed is:

1. A producing method for a polymer film comprising the steps of:
   forming a casting film by casting a dope containing a polymer and a solvent on a moving support;
   peeling said casting film containing said solvent from said support as a wet film;
   blowing air from an air blowing device onto each side edge portions of said wet film, said air blowing device being provided above said wet film, said air pressing against said each of said side edge portions to approximately flatten said side edge portions, an air outlet of said air blowing device being provided above said each of said side edge portions;
   transporting said wet film while approximately flattened side edge portions are being held by film holders; and
   said air blowing device has upper and lower outlets so as to reduce formation of a decompressed area over said wetting film and under said blowing device, wherein said upper and lower outlets are provided on the same side of the film to blow air on the same side of the film.

2. A producing method according to claim 1, wherein a distance H1 between said wet film and a lower end of said air outlet is in a range of 5 mm to 50 mm.

3. A producing method according to claim 1, wherein an angle θ between an air blowing direction of said air from said air outlet and said wet film is in a range of 17° to 60°.

4. A producing method according to claim 1, wherein an air velocity V of said air blown from said air outlet is in a range of 30 m/sec to 100 m/sec.

5. A producing method according to claim 1, wherein said air outlet is a slit extending in a transporting direction of said wet film, and a slit width W1 is in a range of 0.5 mm to 5 mm.

6. A producing method according to claim 5, wherein a distance L1 between an upstream end PU of said air outlet in said transporting direction and a hold start position PH of said wet film by said film holder is in a range of 10 mm to 500 mm, and a distance L2 between said hold start position PH and a downstream end PD of said air outlet in said transporting direction is in a range of 0 mm to 200 mm.

7. A producing method according to claim 1, wherein said polymer is cellulose acylate.

8. A producing method according to claim 1, wherein a remaining solvent in said wet film immediately after peeled off from said support is in a range of 10 mass % to 200 mass %.

9. A producing method according to claim 1, wherein a thickness of a polymer film obtained by drying said wet film is in a range of 30 μm to 300 μm.

10. The method of claim 1, wherein the upper outlet is disposed directly above the lower outlet and both the upper and lower outlets are disposed over the wet film.

* * * * *